(12) United States Patent
Abrahamsen et al.

(10) Patent No.: US 8,331,081 B2
(45) Date of Patent: Dec. 11, 2012

(54) ELECTRICAL SYSTEM, AND ELECTRICAL SWITCHING APPARATUS AND SHUTTER ASSEMBLY THEREFOR

(75) Inventors: Michael Howard Abrahamsen, Greenwood, SC (US); Jon Christopher Beaver, Greenwood, SC (US); David Andrew Venker, St. Louis, MO (US); Timothy Gordon Robirds, Sumter, SC (US)

(73) Assignee: Eaton Corporation, Cleveland, OH (US)

( * ) Notice: Subject to any disclaimer, the term of this patent is extended or adjusted under 35 U.S.C. 154(b) by 282 days.

(21) Appl. No.: 12/951,119

(22) Filed: Nov. 22, 2010

(65) Prior Publication Data

US 2012/0127636 A1 May 24, 2012

(51) Int. Cl.
*H02B 1/20* (2006.01)
*H01H 9/00* (2006.01)

(52) U.S. Cl. ........ 361/617; 361/637; 361/639; 361/640; 200/50.21; 200/50.22

(58) Field of Classification Search .................. None
See application file for complete search history.

(56) References Cited

U.S. PATENT DOCUMENTS

| | | | |
|---|---|---|---|
| 5,486,978 A | 1/1996 | Fishovitz | |
| 5,505,630 A | 4/1996 | Petrisko et al. | |
| 7,064,641 B2 | 6/2006 | Rowe et al. | |
| 7,649,149 B2 * | 1/2010 | Mikkelsen et al. | 200/48 R |
| 7,688,572 B2 | 3/2010 | Yee et al. | |
| 7,775,818 B2 * | 8/2010 | Listl et al. | 439/212 |
| 8,115,124 B2 * | 2/2012 | Maruyama et al. | 200/50.27 |

* cited by examiner

*Primary Examiner* — Boris Chervinsky
(74) *Attorney, Agent, or Firm* — Eckert Seamans Cherin & Mellot, LLC; Grant E. Coffield

(57) ABSTRACT

A shutter assembly is provided for an electrical system including at least one electrical switching apparatus, such as a circuit breaker, and a plurality of electrical bus members, and a plurality of electrical cable members, and a ground member with a plurality of contacts. Each of the conductors of the circuit breaker is removably coupled to a corresponding primary contact to electrically connect the circuit breaker to the electrical bus members and to electrically connect the circuit breaker to the electrical cable members and to electrically connect the circuit breaker to the ground members. The shutter assembly includes a flexible insulating member movably disposed between the conductors and the primary contacts. The flexible insulating member moves between a first position in which it provides access for the conductors to be coupled to the primary contacts, and a second position in which the flexible insulating member isolates and electrically insulates the bus member conductors from the primary contacts and the cable member conductors ("disconnected") or isolates and electrically insulates the cable member conductors from the primary contacts and the ground member ("withdrawn"). An electrical switching apparatus and an electrical system employing the shutter assembly are also disclosed.

20 Claims, 5 Drawing Sheets

ELECTRICAL SYSTEM, AND ELECTRICAL SWITCHING APPARATUS AND SHUTTER ASSEMBLY THEREFOR

BACKGROUND

1. Field

The disclosed concept relates generally to electrical systems and, more particularly, to electrical systems employing electrical switching apparatus. The disclosed concept also relates to electrical switching apparatus, such as circuit breakers. The disclosed concept further relates to shutter assemblies for circuit breakers.

2. Background Information

Electrical apparatus, such as electrical switching apparatus used in power distribution systems, are often mounted within a switchgear enclosure (e.g., without limitation, a panelboard; a load center; a meter breaker panel) either individually or in combination with other electrical meters or switchgear (e.g., without limitation, circuit switching devices and circuit interrupters such as circuit breakers, contactors, motor starters, motor controllers and other load controllers).

The electrical enclosure is typically coupled to and supported by a structure such as, for example, a cabinet or a wall of a building, and includes a number of electrical bus members. Electrical connector assemblies, sometimes generally referred to as "breaker connections," mechanically couple and electrically connect conductors of the electrical apparatus to corresponding primary contacts (e.g., without limitation, stabs) which are in turn electrically connected to electrical bus members. To enhance safety, it is desirable to electrically insulate or close off (e.g., isolate) access to energized breaker connections, for example when switchgear is being removed from the enclosure. However, there is limited space available within the circuit breaker compartment to provide an electrically insulating or isolating mechanism. It is also important not to undesirably impede the ability to relatively quickly and easily connect and disconnect the breaker connections.

There is, therefore, room for improvement in electrical systems, and in electrical switching apparatus, such as circuit breakers, and in shutter assemblies therefor.

SUMMARY

These needs and others are met by embodiments of the disclosed concept, which are directed to a shutter assembly for an electrical switching apparatus, such as a circuit breaker. Among other benefits, the shutter assembly occupies relatively minimal space yet effectively isolates and electrically insulates the breaker connections when the circuit breaker is drawn into and out of electrical contact with the electrical bus members of an electrical system.

As one aspect of the disclosed concept, a shutter assembly is provided for an electrical system. The electrical system comprises at least one electrical switching apparatus and a plurality of electrical bus members having primary contacts. The electrical switching apparatus includes a plurality of conductors. Each of the conductors is removably coupled to a corresponding one of the primary contacts to electrically connect the at least one electrical switching apparatus to the electrical bus members. The shutter assembly comprises: a flexible insulating member structured to be movably disposed between the conductors and the primary contacts, the flexible insulating member being structured to move between a first position corresponding to the flexible insulating member providing access for the conductors to be coupled to the primary contacts, and a second position corresponding to the flexible insulating member being structured to isolate and electrically insulate the conductors from the primary contacts.

The flexible insulating member may include a plurality of openings. When the flexible insulating member is disposed in the first position, each of the conductors may extend through a corresponding one of the openings in the flexible insulating member. The flexible insulating member may be a scroll comprising a first drum, a second drum, and an insulating sheet extending between the first drum and the second drum. The insulating sheet may include a first end and a second end, wherein the first end is movably coupled to the first drum and the second end is movably coupled to the second drum. The first drum and the second drum may be structured to rotate, thereby wrapping or unwrapping the insulating sheet to move the insulating sheet with respect to the conductors and the primary contacts. The electrical system may further comprise a drive mechanism structured to draw the electrical switching apparatus into and out of electrical contact with the primary contacts, wherein the drive mechanism may also move the flexible insulating member between the first position and the second position.

In accordance with another non-limiting example aspect of the disclosed concept, when the flexible insulating member is disposed in the first position, the flexible insulating member may be structured to be gathered on one side of the electrical switching apparatus and, when the flexible insulating member is disposed in the second position, the flexible insulating member may be structured to extend between the conductors and the primary contacts.

An electrical switching apparatus and an electrical system employing the aforementioned shutter assembly, are also disclosed.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
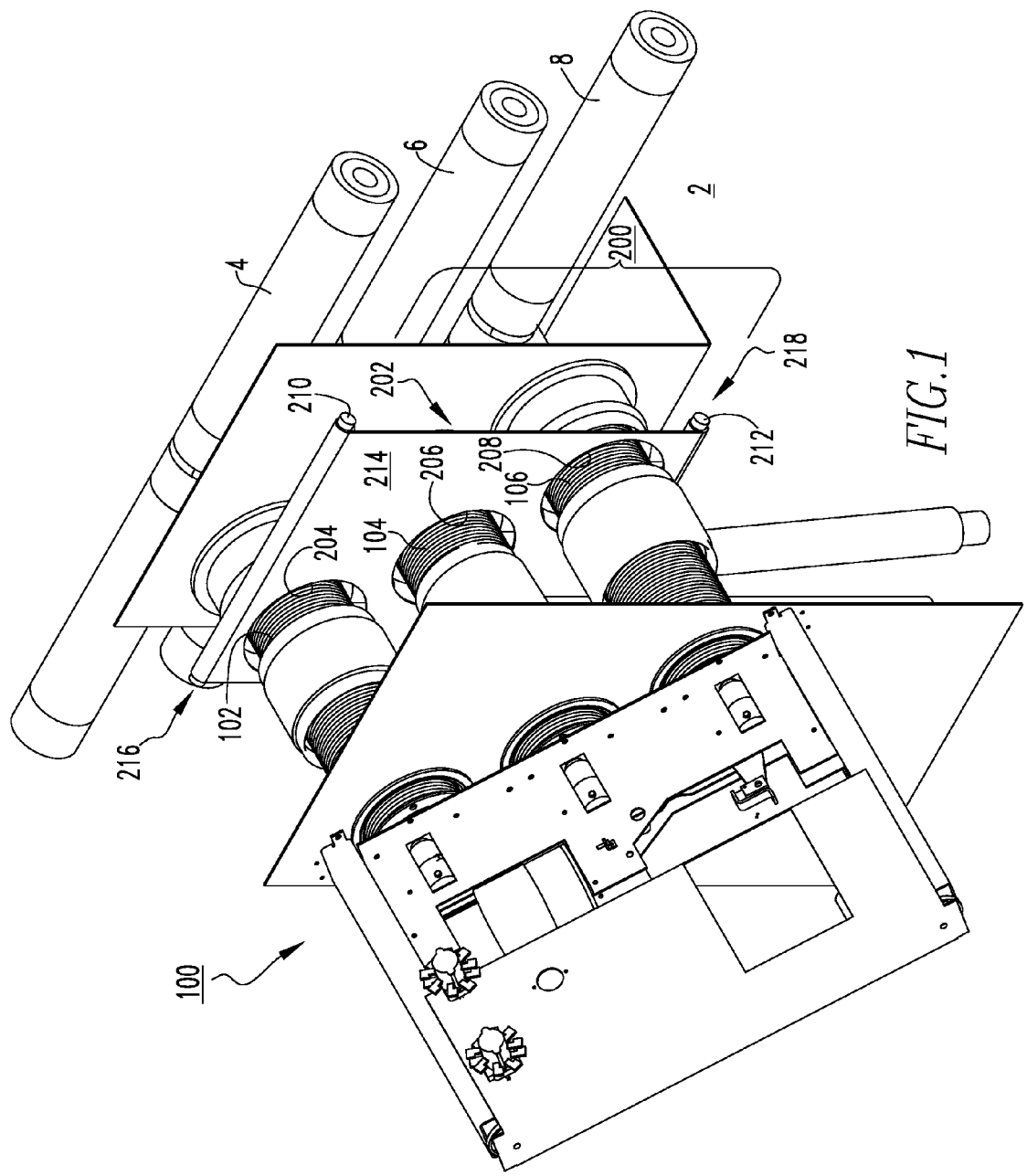
FIG. 1 is an isometric view of a portion of an electrical system, and a circuit breaker and shutter assembly therefor, in accordance with an embodiment of the disclosed concept, with the shutter assembly shown in the position corresponding to the circuit breaker being electrically connected.

Directional phrases used herein, such as, for example, inward, outward, up, down, top, bottom, clockwise, counterclockwise and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "number" shall mean one or an integer greater than one (i.e., a plurality).

FIG. 1 shows a shutter assembly 200 for an electrical system 2 (partially shown). The electrical system 2 includes at least one electrical switching apparatus, such as a circuit breaker 100 (partially shown), and a plurality of electrical bus members 4,6,8 (partially shown) having primary contacts 10,12,14 (all shown in hidden line drawing in FIG. 2; see also FIG. 3).

Figure 2:
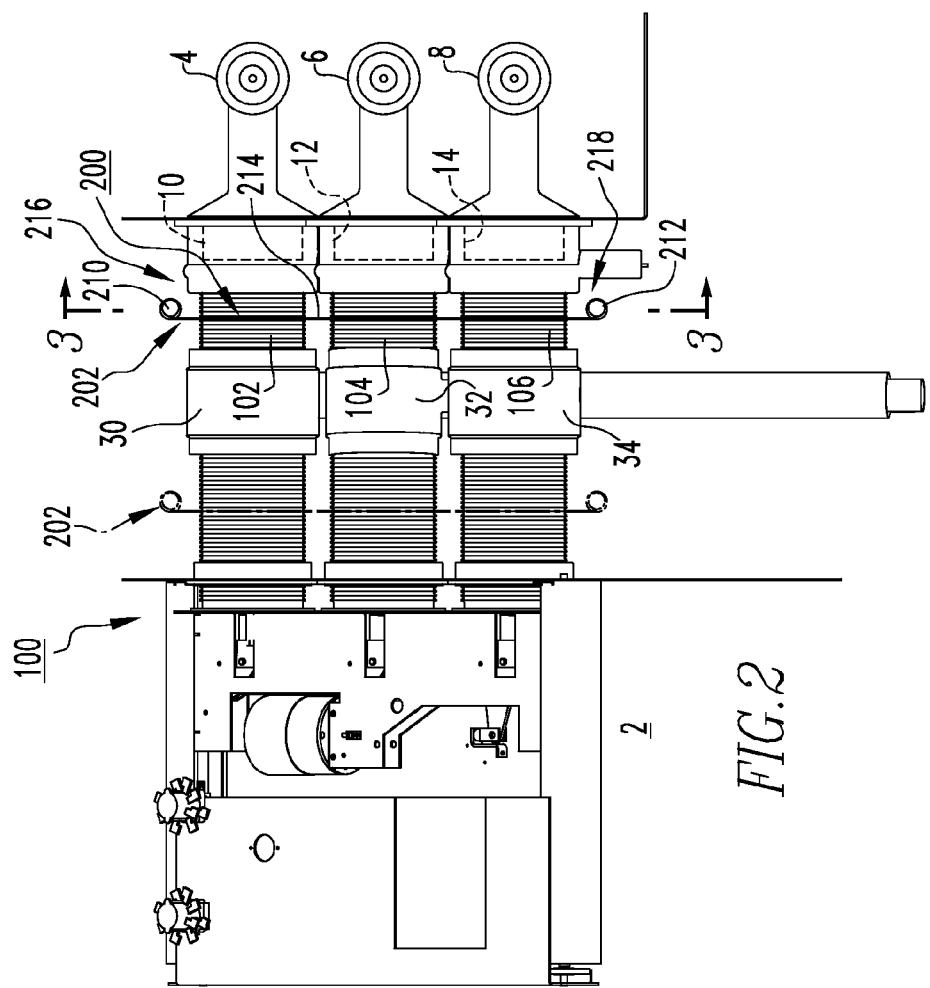
FIG. 2 is a side elevation view of the portion of the electrical system, and circuit breaker and shutter assembly therefor of FIG. 1.

The circuit breaker 100 includes a plurality of conductors 102,104,106 (three are shown). Each of the conductors 102, 104,106 is removably mechanically coupled and electrically connected to a corresponding one of the primary contacts 10,12,14, as best shown in FIG. 2, to electrically connect the circuit breaker 100 to electrical bus members 4,6,8 of the electrical system 2. It will, however, be appreciated that any known or suitable alternative number, type and/or configuration of electrical switching apparatus, conductors, primary contacts and/or bus members could be employed, without departing from the scope of the disclosed concept.

Figure 6:
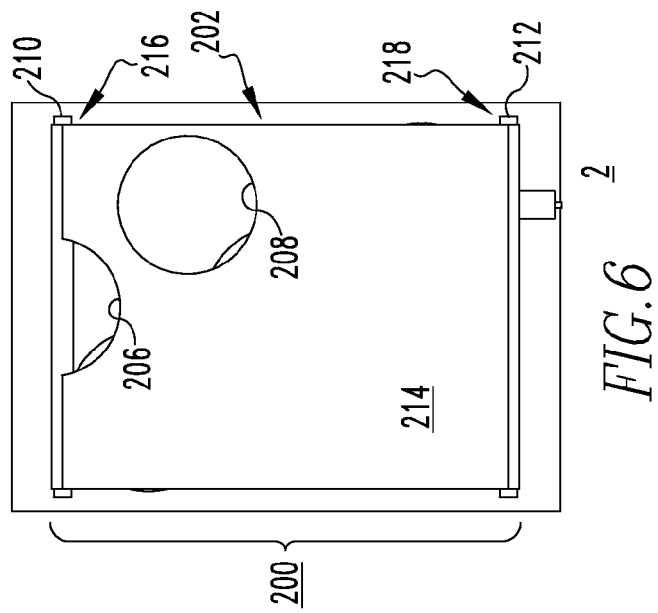
FIG. 6 is a section view taken along line 6-6 of FIG. 5.
Figure 7:
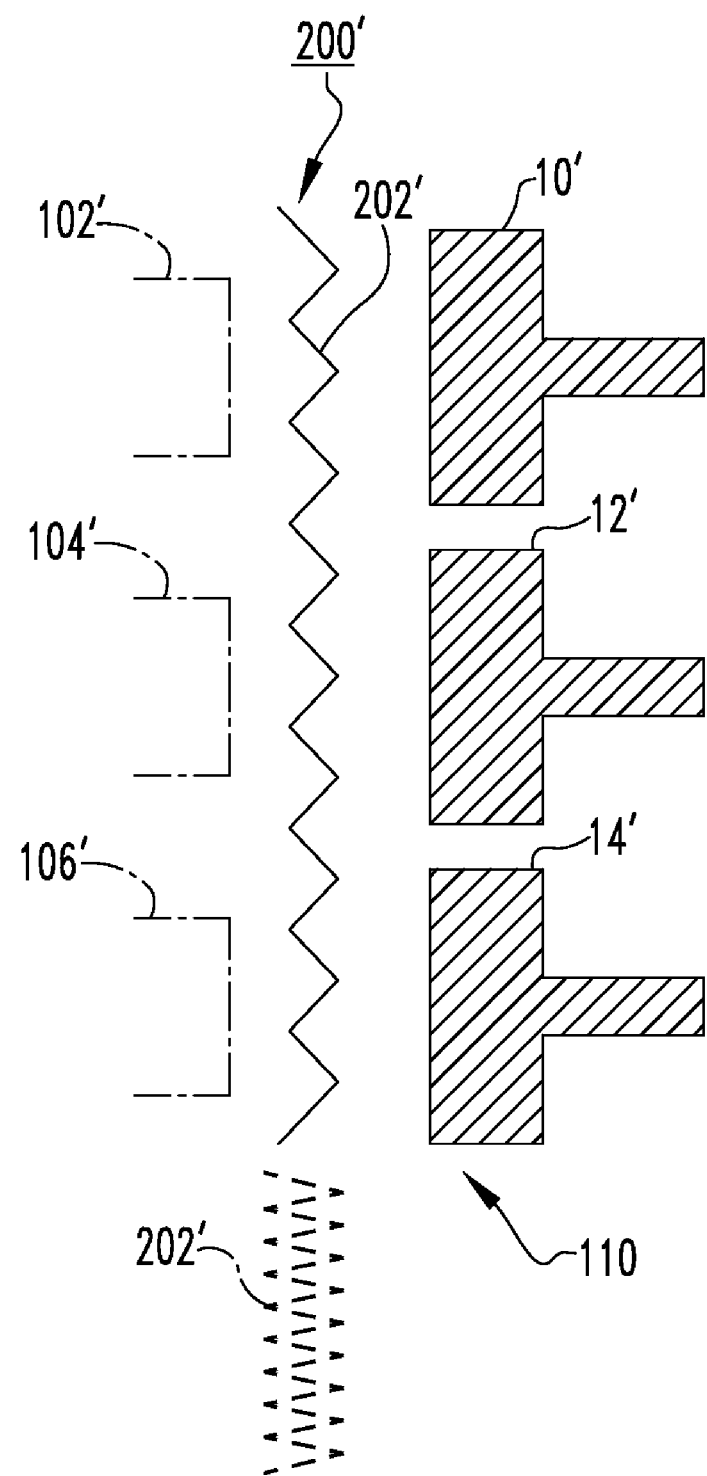
FIG. 7 is a simplified side elevation view of a shutter assembly in accordance with another embodiment of the disclosed concept.

Continuing to refer to FIG. 1, and also to FIGS. 2-6, the shutter assembly 200 includes a flexible insulating member 202 structured to be movably disposed between the conductors 102,104,106 and the primary contacts 10,12,14 (all shown in hidden line drawing in FIG. 2). Specifically, the flexible insulating member 202 is movable between a first position, shown in FIGS. 1-3, corresponding to the flexible insulating member 202 providing access for the conductors 102,104,106 to be coupled to the primary contacts 10,12,14, (all shown in hidden line drawing in FIG. 2) and a second position, shown in FIGS. 4-6, corresponding to the flexible insulating member 202 isolating and electrically insulating the conductors 102,104,106 from the primary contacts 10,12, 14 (all shown in hidden line drawing in FIG. 2). See also insulating member 202' of shutter assembly 200' (discussed hereinbelow) of FIG. 7, shown in solid line drawing in the second position, and in phantom line drawing in the first position.

Figure 3:
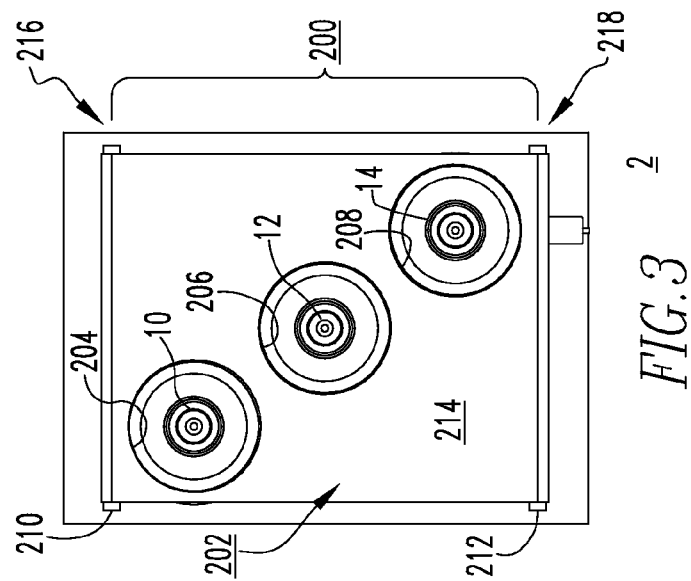
FIG. 3 is a section view taken along line 3-3 of FIG. 2.

In the non-limiting example of FIGS. 1-6, the flexible insulating member 202 includes a plurality of openings 204, 206,208 (all shown in FIGS. 1 and 3). In operation, when the flexible insulating member 202 is disposed in the first position, each of the conductors 102,104,106 extends through a corresponding one of the openings 204,206,208, respectively, of the flexible insulating member 202, as shown in FIGS. 1 and 2. In FIGS. 1-6, the flexible insulating member 202 is a scroll including a first drum 210, a second drum 212, and an insulating sheet 214 extending therebetween. It will be appreciated that the insulating sheet 214 could be made from any known or suitable electrically insulating material (e.g., without limitation, rubber). The insulating sheet 214 includes opposing first and second ends 216,218. The first end 216 is movably coupled to the first drum 210, and the second end 218 is movably coupled to the second drum 212. The first and second drums 210,212 are structured to rotate, thereby wrapping or unwrapping the insulating sheet 214 to move (e.g., upward and downward in the direction of arrow 500 from the perspective of FIG. 4) the insulating sheet 214 with respect to the conductors 102,104,108 and primary contact 10,12,14 (all shown in FIG. 2).

More specifically, when the scroll 202 moves from the first position (FIGS. 1-3) toward the second position (FIGS. 4-6), the first end 216 of the insulating sheet 214 wraps around the first drum 210 and the second end 218 of the insulating sheet 214 unwraps from the second drum 212, thereby moving the insulating sheet 214 and openings 204,206,208 thereof toward the first drum 210 to block access to the primary contacts 10,12,14 (FIG. 2). Conversely, when the scroll 202 moves from the second position (FIGS. 4-6) toward the first position (FIGS. 1-3), the second end 218 of the insulating sheet 214 wraps around the second drum 12 and the first end 216 of the insulating sheet 214 unwraps from the first drum 10, thereby moving the insulating sheet 214 and openings 204,206,208 thereof toward the second drum 12 to align the openings 204,206,208 with the conductors 102,104,106 and the primary contacts 10,12,14 (FIG. 2), respectively.

Figure 4:
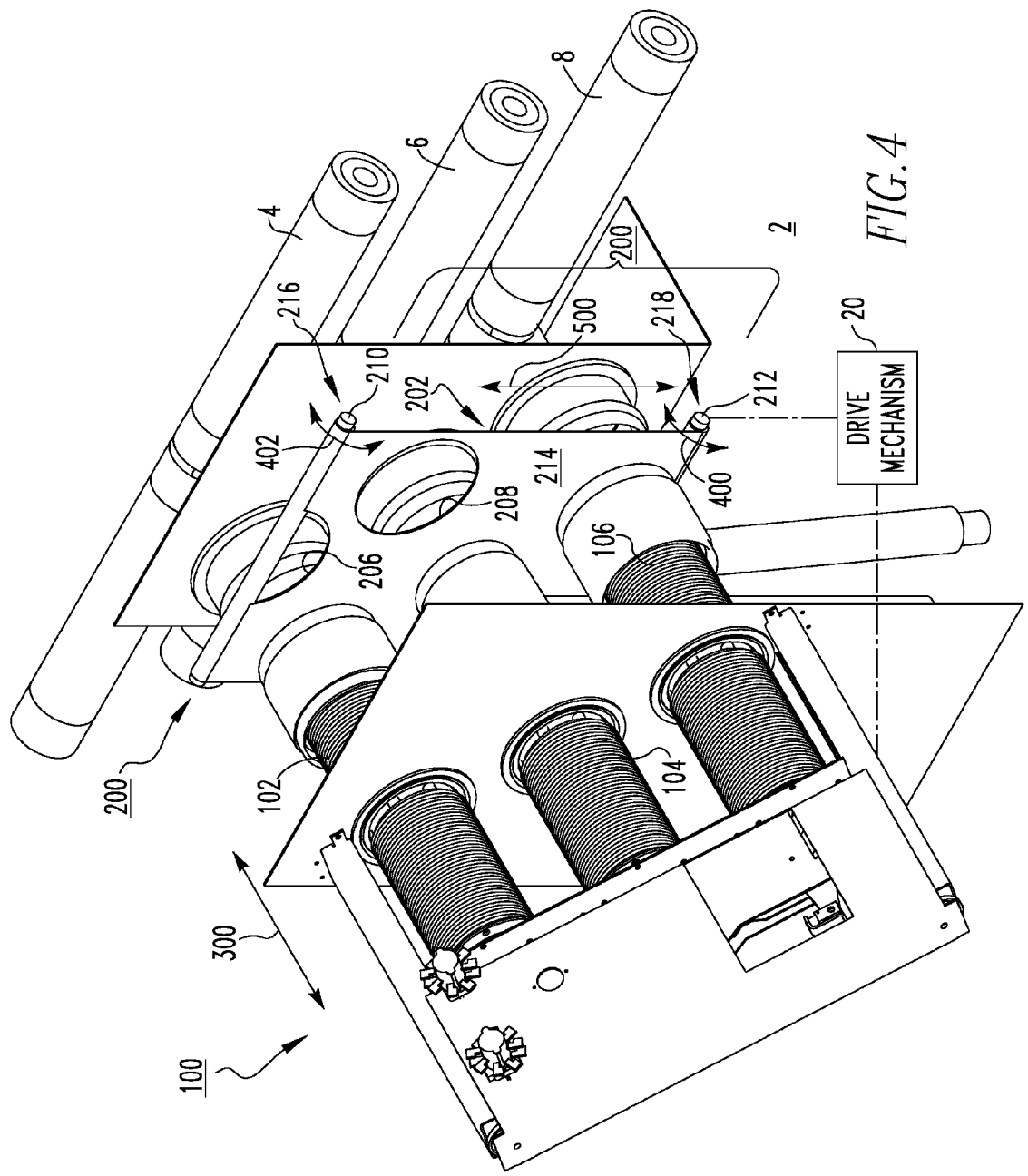
FIG. 4 is another isometric view of the portion of the electrical system, and circuit breaker and shutter assembly therefor modified to show the shutter assembly in the position corresponding to the circuit breaker being disconnected.
Figure 5:
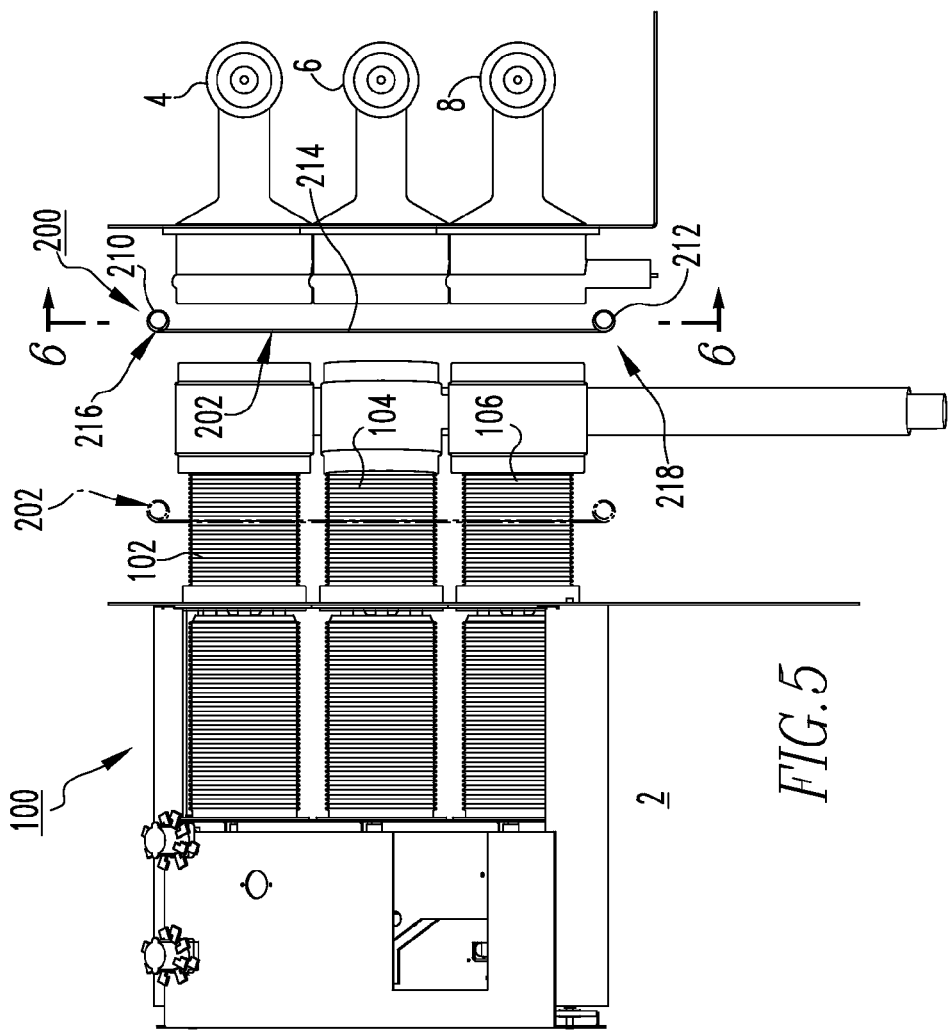
FIG. 5 is a side elevation view of the portion of the electrical system, and circuit breaker and shutter assembly therefor of FIG. 4.

It will be appreciated that a second shutter assembly 200 and flexible insulating member 202 could be alternatively, or additionally, disposed at or about the location shown in phantom line drawing in FIGS. 2 and 5. That is, the electrical system 2 may include a plurality of electrical cable members 30,32,34 (FIG. 2), as well as a ground member with a plurality of contacts. Accordingly, it will be appreciated that any suitable number and/or configuration of shutter assemblies 200 could be employed in accordance with the disclosed concept. For example and without limitation, a first shutter assembly 200 (shown in solid line drawing in FIGS. 2 and 5) can be employed to isolate/insulate the primary contacts of the electrical switching apparatus and bus members, as well as the primary contacts of the bus members and cable members 30,32,34 (FIG. 2). This is known as the "disconnected" position (see, for example, FIGS. 4 and 5). The second, additional shutter assembly 200 and flexible insulating member 202 (shown in phantom line drawing in FIGS. 2 and 5) isolates/ insulates the primary contacts of the switching apparatus and cable members as well as the primary contacts of the cable members and the ground member. This occurs when both shutter assemblies 200 are closed and the electrical switching apparatus 2 is in the "withdrawn" position (not explicitly shown).

As best shown in the section view of FIG. 3, each of the conductors 102,104,106 has a cross-sectional shape and size. In the example of FIG. 3, the insulating sheet 214 includes openings 204,206,208 that are substantially the same shape and size as the cross-sectional shape and size of the conductors 102,104,106. That is, the openings 204,206,208 are substantially round such that the substantially round conductors 102,104,106 extend therethrough. It will, however, be appreciated that the openings could have any known or suitable alternative size, shape and/or configuration, without departing from the scope of the disclosed concept. For example and without limitation, the openings could comprise elongated slots (not shown) within which the conductors 102,104,106 could be disposed even while the scroll 200 moves between positions.

As shown in simplified form in FIG. 4, the electrical system 2 preferably further includes a drive mechanism 20 (shown in simplified form in FIG. 4) structured to draw (e.g., without limitation, move inward and outward in the direction of arrow 300 from the perspective of FIG. 4) the circuit breaker 100 into and out of electrical contact with the primary contacts 10,12,14 (FIG. 2). The drive mechanism 20 also preferably moves the flexible insulating member 202 of the shutter assembly 200 between the first position (FIGS. 1-3) and the second position (FIGS. 4-6). More specifically, the drive mechanism 20 functions to rotate (e.g., clockwise and counterclockwise in the directions of arrows 400 and 402 from the perspective of FIG. 4) the first and/or second drum 210,212 of the shutter assembly 200. In this manner, the flexible insulating member 202 of the shutter assembly 200 can be automatically moved between the first and second positions, as previously described hereinabove.

FIG. 7 shows another non-limiting example embodiment in accordance with the disclosed concept, wherein the flexible insulating member 202' of the shutter assembly 200' is movable between the first position, shown in phantom line drawing, wherein the flexible insulating member 202' is gathered on one side 110 (e.g., bottom side from the perspective of FIG. 7) of the circuit breaker 100, such that it is entirely out of the way of the primary contact 10',12',14' and conductors 102',104',106', and the second position, shown in solid line drawing, wherein the flexible insulating member 202' extends between the conductors 102',104',106' and the primary contact 10',12',14'. In other words, the flexible insulating member 202' of the shutter assembly 200' of FIG. 7 folds or compresses in a manner generally similar to an accordion. It will also be appreciated that the non-limiting example embodiment of FIG. 7 is only partially shown in simplified view for ease of illustration and economy of disclosure.

Accordingly, the disclosed shutter assembly 200,200' provides an automatic safety mechanism for effectively closing off (e.g., isolating; electrically insulating) access to energized breaker connections and switch gear connections, for example, when the circuit breaker 100 is disconnected or removed. In addition to being capable of automatically moving out of the way (e.g., without limitation, moving openings into alignment; moving to one side) when inserting the circuit breaker 100, it also occupies relatively little space within the circuit breaker 100 and/or electrical system 2.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A shutter assembly for an electrical system, said electrical system comprising at least one electrical switching apparatus and a plurality of electrical bus members having primary contacts, said electrical switching apparatus including a plurality of conductors, each of said conductors being removably coupled to a corresponding one of said primary contacts to electrically connect said at least one electrical switching apparatus to said electrical bus members, said shutter assembly comprising:
a flexible insulating member structured to be movably disposed between said conductors and said primary contacts, said flexible insulating member being structured to move between a first position corresponding to said flexible insulating member providing access for said conductors to be coupled to said primary contacts, and a second position corresponding to said flexible insulating member being structured to isolate and electrically insulate said conductors from said primary contacts.

2. The shutter assembly of claim 1 wherein said flexible insulating member includes a plurality of openings; and wherein, when said flexible insulating member is disposed in said first position, each of said conductors extends through a corresponding one of said openings in said flexible insulating member.

3. The shutter assembly of claim 2 wherein said flexible insulating member is a scroll comprising a first drum, a second drum, and an insulating sheet extending between said first drum and said second drum; wherein said insulating sheet includes a first end and a second end; wherein the first end is movably coupled to said first drum; wherein the second end is movably coupled to said second drum; and wherein said first drum and said second drum are structured to rotate, thereby wrapping or unwrapping said insulating sheet to move said insulating sheet with respect to said conductors and said primary contacts.

4. The shutter assembly of claim 3 wherein, when said scroll moves from said first position toward said second position, the first end of said insulating sheet is structured to wrap around said first drum and the second end of said insulating sheet is structured to unwrap from said second drum, thereby moving said insulating sheet and said openings toward said first drum to block access to said primary contacts; and wherein, when said scroll moves from said second position toward said first position, the second end of said insulating sheet is structured to wrap around said second drum and the first end of said insulating sheet is structured to unwrap from said first drum, thereby moving said insulating sheet and said openings toward said second drum to align said openings with said conductors and said primary contacts.

5. The shutter assembly of claim 2 wherein each of said conductors has a cross-sectional shape and size; and wherein said openings are structured to be substantially the same shape and size as the cross-sectional shape and size of said conductors.

6. The shutter assembly of claim 5 wherein said openings are substantially round.

7. The shutter assembly of claim 1 wherein, when said flexible insulating member is disposed in said first position, said flexible insulating member is structured to be gathered on one side of said at least one electrical switching apparatus; and wherein, when said flexible insulating member is disposed in said second position, said flexible insulating member is structured to extend between said conductors and said primary contacts.

8. The shutter assembly of claim 1 wherein said electrical system further comprises a drive mechanism structured to draw said electrical switching apparatus into and out of electrical contact with said primary contacts; and wherein said drive mechanism also moves said flexible insulating member between said first position and said second position.

9. An electrical switching apparatus structured to be removably connected to an electrical system, said electrical system comprising a plurality of electrical bus members having primary contacts, said electrical switching apparatus comprising:
a plurality of conductors each being structured to be removably coupled to a corresponding one of said primary contacts to electrically connect said electrical switching apparatus to said electrical bus members; and
a shutter assembly comprising:
a flexible insulating member structured to be movably disposed between said conductors and said primary contacts, said flexible insulating member being structured to move between a first position corresponding to said flexible insulating member providing access for said conductors to be coupled to said primary contacts, and a second position corresponding to said flexible insulating member being structured to isolate and electrically insulate said conductors from said primary contacts.

10. The electrical switching apparatus of claim 9 wherein said flexible insulating member includes a plurality of openings; and wherein, when said flexible insulating member is disposed in said first position, each of said conductors extends through a corresponding one of said openings in said flexible insulating member.

11. The electrical switching apparatus of claim 10 wherein said flexible insulating member is a scroll comprising a first drum, a second drum, and an insulating sheet extending between said first drum and said second drum; wherein said insulating sheet includes a first end and a second end; wherein the first end is movably coupled to said first drum; wherein the second end is movably coupled to said second drum; and wherein said first drum and said second drum are structured to rotate, thereby wrapping or unwrapping said insulating sheet to move said insulating sheet with respect to said conductors and said primary contacts.

12. The electrical switching apparatus of claim 11 wherein, when said scroll moves from said first position toward said second position, the first end of said insulating sheet wraps around said first drum and the second end of said insulating sheet unwraps from said second drum, thereby moving said insulating sheet and said openings toward said first drum to block access to said primary contacts; and wherein, when said scroll moves from said second position toward said first position, the second end of said insulating sheet wraps around said second drum and the first end of said insulating sheet unwraps from said first drum, thereby moving said insulating sheet and said openings toward said second drum to align said openings with said conductors and said primary contacts.

13. The electrical switching apparatus of claim 9 wherein, when said flexible insulating member is disposed in said first position, said flexible insulating member is gathered on one side of said electrical switching apparatus; and wherein, when said flexible insulating member is disposed in said second position, said flexible insulating member extends between said conductors and said primary contacts.

14. The electrical switching apparatus of claim 9 wherein said electrical system further comprises a drive mechanism structured to draw said electrical switching apparatus into and out of electrical contact with said primary contacts; and wherein said drive mechanism also moves said flexible insulating member between said first position and said second position.

15. An electrical system comprising:
a plurality of electrical bus members having primary contacts; and
at least one electrical switching apparatus, said at least one electrical switching apparatus comprising:
a plurality of conductors each being removably coupled to a corresponding one of said primary contacts to electrically connect said at least one electrical switching apparatus to said electrical bus members, and
a shutter assembly comprising:
a flexible insulating member movably disposed between said conductors and said primary contacts, said flexible insulating member being movable between a first position corresponding to said flexible insulating member providing access for said conductors to be coupled to said primary contacts, and a second position corresponding to said flexible insulating member isolating and electrically insulating said conductors from said primary contacts.

16. The electrical system of claim 15 wherein said flexible insulating member of said shutter assembly includes a plurality of openings; and wherein, when said flexible insulating member is disposed in said first position, each of said conductors extends through a corresponding one of said openings in said flexible insulating member.

17. The electrical system of claim 16 wherein said flexible insulating member is a scroll comprising a first drum, a second drum, and an insulating sheet extending between said first drum and said second drum; wherein said insulating sheet includes a first end and a second end; wherein the first end is movably coupled to said first drum; wherein the second end is movably coupled to said second drum; and wherein said first drum and said second drum are structured to rotate, thereby wrapping or unwrapping said insulating sheet to move said insulating sheet with respect to said conductors and said primary contacts.

18. The electrical system of claim 17 wherein, when said scroll moves from said first position toward said second position, the first end of said insulating sheet wraps around said first drum and the second end of said insulating sheet unwraps from said second drum, thereby moving said insulating sheet and said openings toward said first drum to block access to said primary contacts; and wherein, when said scroll moves from said second position toward said first position, the second end of said insulating sheet wraps around said second drum and the first end of said insulating sheet unwraps from said first drum, thereby moving said insulating sheet and said openings toward said second drum to align said openings with said conductors and said primary contacts.

19. The electrical system of claim 15 wherein, when said flexible insulating member is disposed in said first position, said flexible insulating member is gathered on one side of said at least one electrical switching apparatus; and wherein, when said flexible insulating member is disposed in said second position, said flexible insulating member extends between said conductors and said primary contacts.

20. The electrical system of claim 15 wherein said at least one electrical switching apparatus is a circuit breaker; wherein said electrical system further comprises a drive mechanism; wherein said drive mechanism draws said circuit breaker into and out of electrical contact with said primary contacts; and wherein said drive mechanism also moves said flexible insulating member between said first position and said second position.

* * * * *